Figure 1:
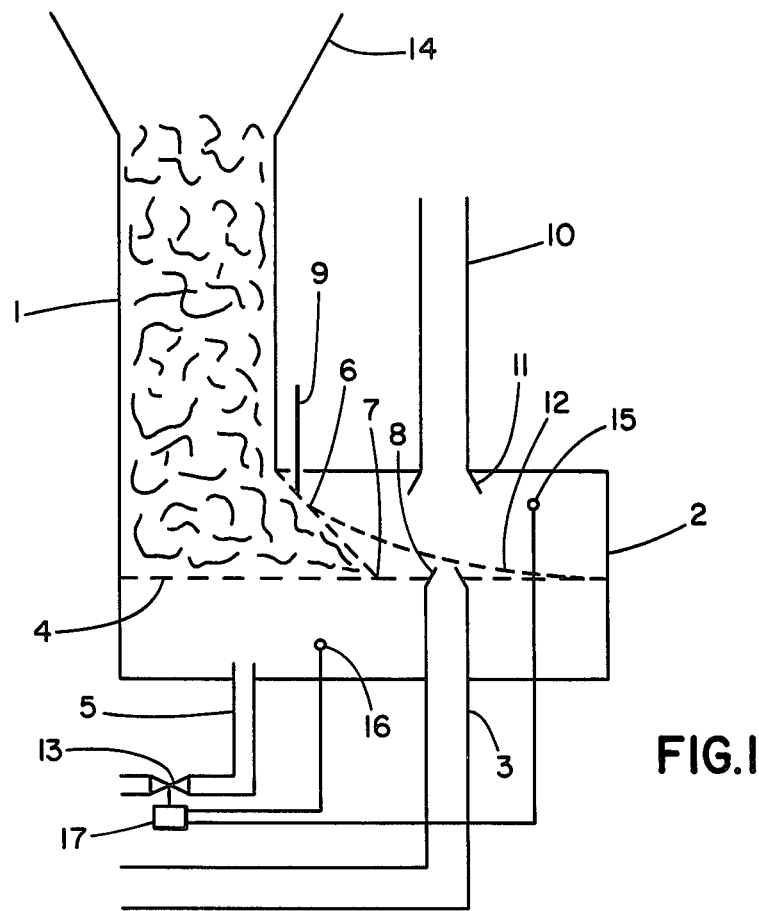

United States Patent [19]

Hanrot et al.

[11] 4,279,549
[45] Jul. 21, 1981

[54] METHOD AND APPARATUS OF SELF-REGULATION FOR A PNEUMATIC CONVEYOR

[75] Inventors: Jean-Pascal Hanrot, Aix-en-Provence; Jacky Volpeliere, Mimet, both of France

[73] Assignee: Aluminum Pechiney, Lyons, France

[21] Appl. No.: 78,477

[22] Filed: Sep. 24, 1979

Related U.S. Application Data

[63] Continuation-in-part of Ser. No. 904,395, May 10, 1978, abandoned.

[30] Foreign Application Priority Data

May 18, 1977 [FR] France ................. 77 16070

[51] Int. Cl.³ .................................. B65G 57/66
[52] U.S. Cl. .................................. 406/14; 406/90; 406/142
[58] Field of Search ................ 406/14, 30, 89, 90, 406/91, 138, 142, 143

[56] References Cited

U.S. PATENT DOCUMENTS 3,964,793  6/1976  Volpeliere .................. 406/30

Primary Examiner—Jeffrey V. Nase
Attorney, Agent, or Firm—McDougall, Hersh & Scott

[57] ABSTRACT

A method of self regulation of a pneumatic conveyor of pulverulent material comprising a feed column at the foot of which is formed a talus, a forwarding chamber provided with a porous fluidization wall, tubes for fluidization and for supply of gas at super pressure, and conveying tubes in which a set pressure Pf is selected below the porous wall for a desired flow of material in the forwarding column, in that a pressure Pc is established above the said wall in the forwarding chamber so that a reduction in the circulation of gas at the pressure Pf through the porous wall corresponds to any increase of Pc beyond Pf while an increase in the said circulation of gas corresponds to any reduction in Pc below Pf.

2 Claims, 2 Drawing Figures

METHOD AND APPARATUS OF SELF-REGULATION FOR A PNEUMATIC CONVEYOR

This is a continuation-in-part of our copending application Ser. No. 904,395, filed May 10, 1978, and entitled: "Method of Self-Regulation for a Pneumatic Conveyor" (now abandoned).

Numerous methods and devices for pneumatic conveyance have previously been described in technical literature.

Thus, for example, U.S. Pat. No. 2,827,333 describes a pneumatic conveyor for pulverulent material comprising a material distributor formed by an impeller and means for creating air pressure and distributing it in a chamber for mixing the said material and gas, this chamber being divided in the middle by a grid which causes the gas to be distributed homogeneously and the particles to be conveyed. Although the process is very advantageous, it has disadvantages, including wear by abrasion which could be rapid, depending upon the materials conveyed, causing an increase in the quantity of pulverulent material delivered and thus blocking the column.

Another method, described in French Pat. No. 1,152,269, which is in fact a significant improvement in the field of pneumatic conveying, involved feeding the pneumatic conveyor tube with the powder coming directly from the bottom of a column permanently containing powder which has been fluidized in the open air, the pressure of the air blown by an injection being balanced by the height of the column of pulverulent material. Such a method had the advantage of avoiding the use of powder valves in the fluidization. However, this method had certain disadvantages which made it unsuitable for universal application. With this device, the flow-rate of pulverulent material did in fact have to be regulated below a critical threshold at which the column would be blocked.

French Pat. No. 2,236,758 describes a method for regulating the flow weight of pulverulent materials in a continuous pneumatic conveyor by injection of gas and balanced by a fluidized column in which the pressure of the injected gas was measured for a given flow weight of gas and acted on the quantity of pulverulent material introduced into the fluidized column to maintain the pressure at a predetermined value. Whatever the very great improvements brought by this device, it was still necessary to provide a monitored member for mechanical regulation upon contact with the material, a member which could be the seat of abrasion or even of erosion.

In the course of our research into this field, we have found and developed an improvement to automatic regulating devices for pneumatic conveyors which overcomes the disadvantages mentioned above.

The method, according to the invention, comprises a pneumatic conveyor having a feed column containing the pulverulent material, at the foot of which column is formed a talus, a forwarding chamber fed by said column comprising a porous fluidization wall, a feed pipe having a selected flow-rate of gas at super pressure, the injector of which opens above the porous fluidization wall and in the axis of the orifice of a tube intended for the pneumatic conveyor as well as a feed pipe for fluidization gas opening beneath the porous fluidization wall, characterized in that, in order to reduce the angle of the talus so as to allow the foot of the said talus to be brought into the gaseous flux, the said material is fluidized by making the gas circulate through the porous wall and the material to be conveyed. In order to produce this flow, a set pressure $Pf$ is selected below the porous wall for a desired flow of material in the forwarding pipe, a pressure $Pc=Pf$ is established above the said wall in the forwarding chamber so that any increases of $Pc$ beyond $Pf$, which tends to increase the flow of pulverulent material, corresponds to a réduction in the circulation of gas at pressure $Pf$ through the porous wall and the pulverulent material while an increase in the said circulation of gas through the porous wall and the pulverulent material corresponds to any reduction of $Pc$ below $Pf$ which tends to reduce the flow of pulverulent material.

The method, according to the invention, involves feeding a pneumatic conveyor tube with a pulverulent material emanating directly from the bottom of a charged column containing the pulverulent material. The said column may be of different shape and capacity such as, for example, a cylindrical shape, a feed hopper, the upper section of which is preferably at a constant pressure.

The pulverulent material is passed from the feed column to the pneumatic conveyor tube by means of a forwarding chamber formed, for example, by a hollow parallelepiped.

The forwarding chamber is provided with means of fluidization comprising a porous wall and a fluidization gas injector as well as means for pneumatic transportation of the pulverulent material comprising a feed pipe for gas at super pressure provided at its end with an injector opening above the porous fluidization wall and an inlet orifice in the pneumatic conveyor tube, the said orifice being formed by a nozzle situated in the axis of the said gas injector.

A talus of the pulverulent material is formed at the foot of the feed column which opens into the forwarding chamber when the device stops, the angle of the talus to the porous fluidization wall depending essentially upon the said material to be transported.

In a preferred embodiment of the invention, the foot of the talus, at rest, makes tangential contact with the injector of the feed pipe for gas at super pressure. The distance between the foot of the talus, at rest, and the said injector may advantageously be regulated by a device which more or less reduces the height of the outlet from the feed column in relation to the porous fluidization wall.

In order to allow the pulverulent material forming the renewable talus to enter the gas flow emanating from the injector, the said material is fluidized by circulating a fluidization gas through the porous wall. The angle of the talus is thus reduced and its foot tends to move beyond the gas injector.

In order for the fluidization gas to flow through the porous wall and through the bed of pulverulent material for fluidization, a fluidization pressure $Pf$ selected fo a flow of material to be conveyed as a function of the minimum height of pulverulent material in the feed column is established below the porous wall of the forwarding chamber. Thus, an equilibrium tends to be established on each side of the porous fluidization wall, between the pressure $Pf$ and the pressure $Pc$ prevailing above the said porous wall.

Thus, when the pressure $Pc$ decreases and becomes lower than $Pf$, a gaseous fluidization stream passes through the porous wall and the pulverulent material in such a way that the injector is fed with pulverulent material and the pulverulent material is conveyed.

However, when the pressure Pc increases until it is higher than Pf, the gaseous fluidization current stops passing through the porous wall and the pulverulent material so that the injector is no longer fed with pulverulent material. Depending upon the nature of the material, the numerical difference between Pc and Pf, expressed as an absolute value, is generally of a small percentage. This difference is caused by the avalanching nature of the material fed to the forwarding chamber. Thus, for a selected operating rate, a sinusoidal equilibrium is established around the set value.

Pneumatic conveying in accordance with the practice of this invention is thus self-regulated and the pulverulent material flows continuously and uniformly because the fluidization pressure Pf has been selected and maintained at a value for a desired flow of pulverulent material.

Figure 2:
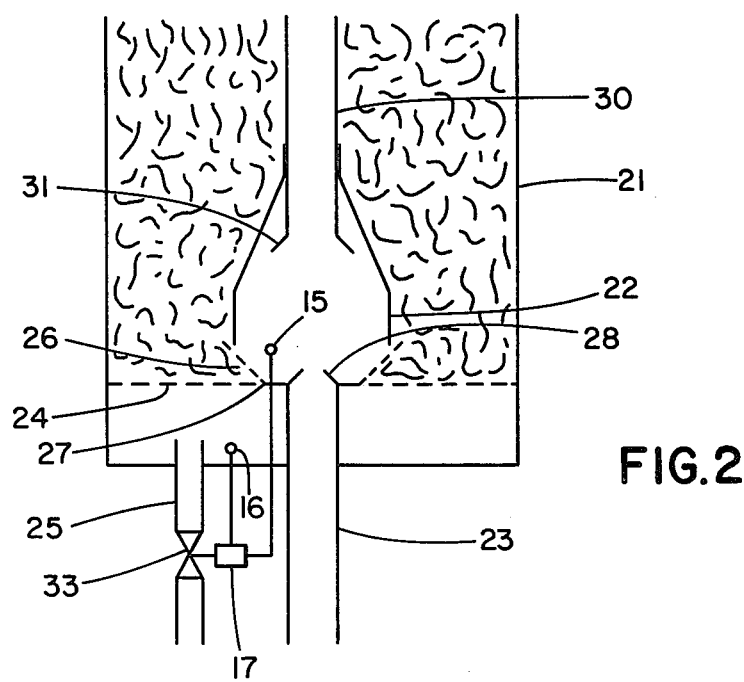

These and other objects and advantages of this invention will hereinafter be described, and for purposes of illustration, but not of limitation, an embodiment of the invention is shown in the accompanying drawing in which:

FIG. 1 is a schematic sectional elevational view of a portion of a pneumatic conveyor showing the method for self-regulation; and FIG. 2 is a view similar to that of FIG. 1 showing a modification of a method for self-regulation in accordance with the practice of this invention.

In the drawing, the pneumatic conveyor comprises a feed column 1, a forwarding chamger 2, a tube for gas at super pressure 3 provided with an injector 8, a porous fluidization wall 4, a tube for fluidizing gas 5 and a pneumatic conveyor tube 10 provided with a nozzle 11.

The feed column 1 receives the pulverulent material from the hopper 14.

When the tubes 3 and 5 for gas at super pressure and for fluidization, respectively, are not supplied with gas, a talus 6 is established at the foot of the feed column 1 and on the porous fluidization wall 4, the distance between the foot 7 of the talus 6 and the injector 8 being regulated by the device 9.

The passage of the pulverulent material from the column 1 to the pneumatic conveyor tube 10 is thus effected in the forwarding chamber 2 when the tubes 3 and 5 for gas at super pressure and for fluidization are supplied, causing a reduction in the angle of the talus 6 by the fluidization of the material forming the talus and its spread beyond the injector 8.

A fluidization pressure Pf is established in the chamber 2 below the porous wall 4 using the control means 13 for a selected flow of pulverulent material to be conveyed in 10, and the fluidization gas is supplied by the tube 5. A pressure Pc which depends upon the quantity of pulverulent material introduced into the flow from the tube 10, for the flow of gas selected in 3, prevails above the fluidization wall 4. The means 13 is adjusted for selected flow by controller 17 in response to pressure sensors 15 and 16 in the spaces above and below the porous wall 4.

When the pressure Pc above the porous wall 4 decreases until it is lower than Pf, a strong gaseous fluidization stream is established through the said wall which fluidizes the pulverulent material and thus brings it into the action zone of the injector 8 and carries the said material into the nozzle 11 of the tube 10.

When the pressure Pc increases until it is higher than Pf, the gaseous fluidization stream decreases or even stops passing through the porous wall 4 and the talus 6 so that the injector 8 is supplied to a lesser extent or even not at all with pulverulent material to be conveyed.

The method according to the invention thus represents a method for the self-regulation of a flow of pulverulent material to be conveyed, around the selected value depending upon the pressure Pf, thus eliminating any risk of the forwarding column 10 becoming blocked.

In FIG. 2, which shows a concentric dispatch column, the pneumatic conveyor comprises an annular feed column 21, a forwarding chamber 22 formed of a truncated cone, the height of which may be adjusted in relation to the porous fluidization wall, a tube 23 for gas at super pressure, provided with an injector 28, a porous fluidization wall 24, a fluidization tube 25 and a pneumatic conveyor tube 30 provided with a nozzle 31.

When the tubes 23 and 25 of gas at super pressure and for fluidization are not supplied with gas, a talus 26 is formed at the foot of the conical forwarding chamber 22 and on the porous fluidization wall 24 and the distance between the foot 27 of the talus 26 and the injector 28 is regulated by the relative position of the forwarding chamber 22 and of the porous fluidization wall 24.

The pulverulent material contained in the column 21 thus passes into the pneumatic conveyor tube 30 by means of the forwarding chamber 22 when the tubes 23 and 25 of gas at super pressure and for fluidization are supplied, causing a reduction in the angle of the talus 26 and the spread of the pulverulent material beyond the injector 28.

For a selected flow of pulverulent material to be conveyed in 30, a fluidization pressure Pf is established below the porous wall 24, using the means of regulation 33, the fluidization gas being carried by 25. A pressure Pc, which depends for the flow of gas selected at 23 upon the quantity of pulverulent material introduced into the flow from the nozzle 30, prevails above the fluidization wall 24.

When the pressure Pc above the porous wall 24 decreases until it is lower than Pf, a strong gaseous fluidization stream is established through the said wall which fluidizes the pulverulent material and brings it into the zone of action of the injector 28. The said material is thus carried along to the nozzlle 31 of the tube 30.

When the pressure Pc increases so as to exceed Pf, the gaseous fluidization stream is reduced and eventually stops passing through the porous wall 24. The angle of the talus 26 thus increases in such a way that the injector 28 is fed with less pulverulent material.

Therefore, as in the first case, this process is self-regulating and eliminates the risk of the forwarding column 30 becoming blocked.

EXAMPLE 1

In an industrial installation, according to FIG. 1, a pulverulent material consisting of crushed marble having a particle size of at most 50μ was transported pneumatically.

The feed column 1 had a diameter of 0.04 meters and a height of 4.50 meters while the forwarding column 10 has a diameter of 0.065 meters and a length of about 30 meters.

The gas for fluidization and transportation was air.

The flow accrued in the tubes 5 and 3 was 4 Nm³/min.

The mass of pulverulent material conveyed in the column 10 was measured for 3 values of the fluidization pressure Pf established below the porous fluidization wall 4.

|  | Case 1 | Case 2 | Case 3 |
|---|---|---|---|
| Fluidization pressure Pf, in bar | 0.165 | 0.220 | 0.300 |
| Pressure in the tube 3 for gas at super pressure, in bar | 0.195 | 0.250 | 0.350 |
| Mass of pulverulent material transported in 10, in tons/hour | 2.20 | 2.82 | 4.68 |

EXAMPLE 2

A pulverulent material consisting of calcinated alumina having a particle diameter of at most 150μ was conveyed pneumatically in an industrial pneumatic conveyor according to FIG. 1.

The feed column 1 had a diameter of 0.4 meters and a height of 5.50 meters while the forwarding tube 10 had a diameter of 0.125 meters and a length of 50 meters.

The gas required for fluidization and transportation was air. The flow accrued in the tubes 5 and 3 was 19 Nm³/min.

Tests were carried out for three values of the fluidization pressure Pf of the bed plate. The mass of pulverulent material transported in the tube 10 was then measured.

The results are set out in the table below:

|  | Case 1 | Case 2 | Case 3 |
|---|---|---|---|
| Fluidization pressure Pf, in bar | 0.26 | 0.30 | 0.34 |
| Pressure in the tube 3 for gas at super pressure, in bar | 0.35 | 0.40 | 0.44 |
| Mass of pulverulent material conveyed in 30 in tons/hour | 4.25 | 5.26 | 6.24 |

We claim:

1. A self-regulating pneumatic conveyor for pulverulent material comprising a vertically disposed feed column, means for feeding the feed column with pulverulent material for gravitation flow downwardly therethrough, a vertically disposed pneumatic conveying tube alongside the feed column, a forwarding chamber between the feed column and the pneumatic conveyor tube having a porous bottom fluidization wall and a wall separating the feed column and the forwarding chamber which terminates in spaced relation above the porous fluidization wall whereby the material at the foot of the feed column forms a talus which extends into the forwarding chamber in the direction toward the pneumatic conveying tube, a feed tube for introducing a gas under pressure into the forwarding chamber, a tube for supplying fluidization gas below the porous fluidization wall, means for measuring the pressure Pf below the porous fluidization wall, means for measuring the pressure Pc above the porous fluidization wall, and means for varying the circulation of gas from the supplying tube in response to pressure Pf as compared to pressure Pc for reducing the circulation of gas at pressure Pf through the porous wall when the pressure Pc above the wall exceeds the pressure Pf with corresponding decrease in flow of pulverulent material, and increasing the circulation of gas at pressure Pf through the porous wall when the pressure Pc above the wall falls below the pressure Pf.

2. A self-regulating pneumatic conveyor as claimed in claim 1 in which said wall is movable for varying the spaced relation between itself and the porous fluidization wall for adjustment of the talus.

* * * * *